United States Patent
Wright et al.

(10) Patent No.: US 6,415,357 B1
(45) Date of Patent: Jul. 2, 2002

(54) CACHING METHOD AND APPARATUS

(75) Inventors: Daniel F. Wright, Phoenixville; John E. Black, Downingtown; Stanley P. Naddeo, Wayne, all of PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/471,721

(22) Filed: Dec. 23, 1999

(51) Int. Cl.[7] ............................................. G06F 12/00
(52) U.S. Cl. ..................... 711/133; 711/143; 711/145; 711/159
(58) Field of Search ................................ 711/133, 130, 711/147, 143, 145, 159

(56) References Cited

U.S. PATENT DOCUMENTS

| | | | |
|---|---|---|---|
| 4,159,532 A | 6/1979 | Getson, Jr. et al. | 364/900 |
| 4,774,687 A | 9/1988 | Taniguchi et al. | 364/900 |
| 4,802,086 A | 1/1989 | Gay et al. | 364/200 |
| 5,023,776 A | 6/1991 | Gregor | 364/200 |
| 5,117,493 A | 5/1992 | Jensen | 395/425 |
| 5,155,825 A | 10/1992 | Moughanni et al. | 395/425 |
| 5,317,720 A * | 5/1994 | Stamm et al. | 711/122 |
| 5,333,296 A | 7/1994 | Bouchard et al. | 395/425 |
| 5,353,426 A | 10/1994 | Patel et al. | 395/425 |
| 5,363,486 A | 11/1994 | Olson et al. | 395/250 |
| 5,404,482 A * | 4/1995 | Stamm et al. | 711/108 |
| 5,404,483 A * | 4/1995 | Stamm et al. | 711/108 |
| 5,506,967 A | 4/1996 | Barajas et al. | 395/250 |
| 5,539,895 A | 7/1996 | Bishop et al. | 395/465 |
| 5,544,340 A | 8/1996 | Doi et al. | 395/445 |
| 5,561,779 A | 10/1996 | Jackson et al. | 395/449 |
| 5,579,503 A | 11/1996 | Osborne | 395/446 |
| 5,590,379 A | 12/1996 | Hassler et al. | 395/851 |
| 5,664,145 A | 9/1997 | Apperley et al. | 711/117 |
| 5,666,482 A | 9/1997 | McClure | 395/182.06 |
| 5,687,348 A | 11/1997 | Whittaker | 395/460 |
| 5,708,837 A | 1/1998 | Handlogten | 395/800 |
| 5,715,425 A | 2/1998 | Goldman et al. | 395/445 |
| 5,831,640 A | 11/1998 | Wang et al. | 345/521 |
| 5,845,324 A * | 12/1998 | White et al. | 711/128 |
| 6,061,765 A * | 5/2000 | Van Doren et al. | 711/141 |
| 6,105,108 A * | 8/2000 | Steely et al. | 711/118 |
| 6,366,984 B1 * | 4/2002 | Carmean et al. | 710/52 |

* cited by examiner

Primary Examiner—Matthew Kim
Assistant Examiner—Stephen Elmore
(74) Attorney, Agent, or Firm—Woodcock Washburn LLP; Mark T. Starr; Lise A. Rode

(57) ABSTRACT

As copies of data from a main memory are stored in a cache memory of a processor of a computer system as original data, the addresses of those copies are stored successively in a queue. Once the depth of the queue is reached, the storage of each new address in the queue causes a previously stored address to be output from the queue. For each address output from the queue, the corresponding original data in the cache is returned to the main memory. The amount of original data stored in the cache is therefore limited. Preferably, the queue comprises a first-in, first-out queue, and the depth of the queue is programmable.

9 Claims, 3 Drawing Sheets

CACHING METHOD AND APPARATUS

FIELD OF THE INVENTION

The present invention is directed to computer systems, and more particularly, to data caching methods and apparatus for improved performance in such systems.

BACKGROUND

A multiprocessor computer system, by definition, comprises a plurality of instruction processors. Each instruction processor typically has access to the main memory of the computer system. In many multiprocessor computer systems, each instruction processor has its own local cache memory for storing frequently accessed data from the main memory. When a given processor accesses data from an address in main memory, a copy of the retrieved data is stored locally in its cache memory. On subsequent requests for data at the same address, the data can be read out of the local cache memory, rather than having to access the main memory. Accessing data from a local cache memory is much faster than accessing data from main memory, and thus the use of cache memories in a multiprocessor computer system typically improves the performance of the system.

Some multiprocessor computer systems allow copies of data from the main memory to be stored in the local cache of a given processor in either a read-only form (i.e., the processor is not permitted to modify the data in its cache) or a writeable form (meaning the processor is permitted to modify the data in its cache). A writeable copy of data stored in a local cache is referred to herein as "original" data. A read-only copy of data stored in a local cache is referred to as a "copy". In other nomenclature, a processor that holds data in its cache in a writeable form (i.e., "original" data) is sometimes referred to as holding that data in an "exclusive" state (or as having "exclusive" access rights to that data), and a processor that holds data in its cache in a read-only form (i.e., a "copy") is sometimes referred to as holding that data in a "shared" state (or as having "shared" access rights in that data).

When a processor attempts to fetch data from an address in main memory and that data is currently stored as "original" data in the local cache of another processor, that other processor must "return" the original data to main memory (or pass it directly to the requesting processor) so that it can be accessed by the requesting processor. This is commonly referred to as a "return" operation. As the number of processors in a multiprocessor computer system increases, the inventors have discovered that the overhead associated with the movement of original data between processors (e.g., as a result of numerous "return" operations) results in a larger than expected performance degradation. The present invention addresses this problem.

SUMMARY OF THE INVENTION

The present invention is directed to a method and apparatus for use in a computer system having a main memory, a processor that issues addresses to the main memory to retrieve data stored at those addresses, and a cache in which copies of data retrieved by the processor are temporarily stored. According to the method of the present invention, each time original data (i.e., a modifiable copy of data) is fetched from the main memory at a particular address and a copy of the data is stored in the cache, the address of the copy of the data is stored in a queue having a predetermined depth. Once the depth of the queue is reached, the storage of each new address in the queue causes a previously stored address to be output from the queue. For each address output from the queue, the cache returns the corresponding data to the main memory. Use of the queue in accordance with this method effectively places a limit on the amount of original data stored in the cache. Preferably, the queue comprises a first-in, first-out queue. Also, the depth of the queue (i.e., the number of individual address entries in the queue) preferably is programmable, providing flexibility in establishing the limit on the amount of original data in the cache.

Apparatus according to the present invention, for use in a computer system having a main memory, a processor that issues addresses to the main memory to retrieve data stored at those addresses, and a cache in which copies of data retrieved by the processor are temporarily stored, comprises a queue that stores the address of each copy of data stored in the cache. The queue has a depth whereby once the depth is reached, the addresses are successively read out of the queue. The cache then returns to the main memory, for each address read out of the queue, the corresponding data stored in the cache. As mentioned above, queue preferably comprises a first-in, first-out queue, and the depth of the queue is preferably programmable.

While the present invention can be used in single processor computer systems, the invention is particularly useful in larger multiprocessor computer systems, where the overhead associated with "return" requests, which result for example when a task running on one processor requests access to original data held in the cache of another processor, can lead to significant performance degradation in the system. In such systems, the present invention can be used to limit the amount of original data held in the caches of each processor, thereby reducing the overall number of "return" requests issued to the processor caches. This minimizes the previously discovered performance degradation.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Figure 1:
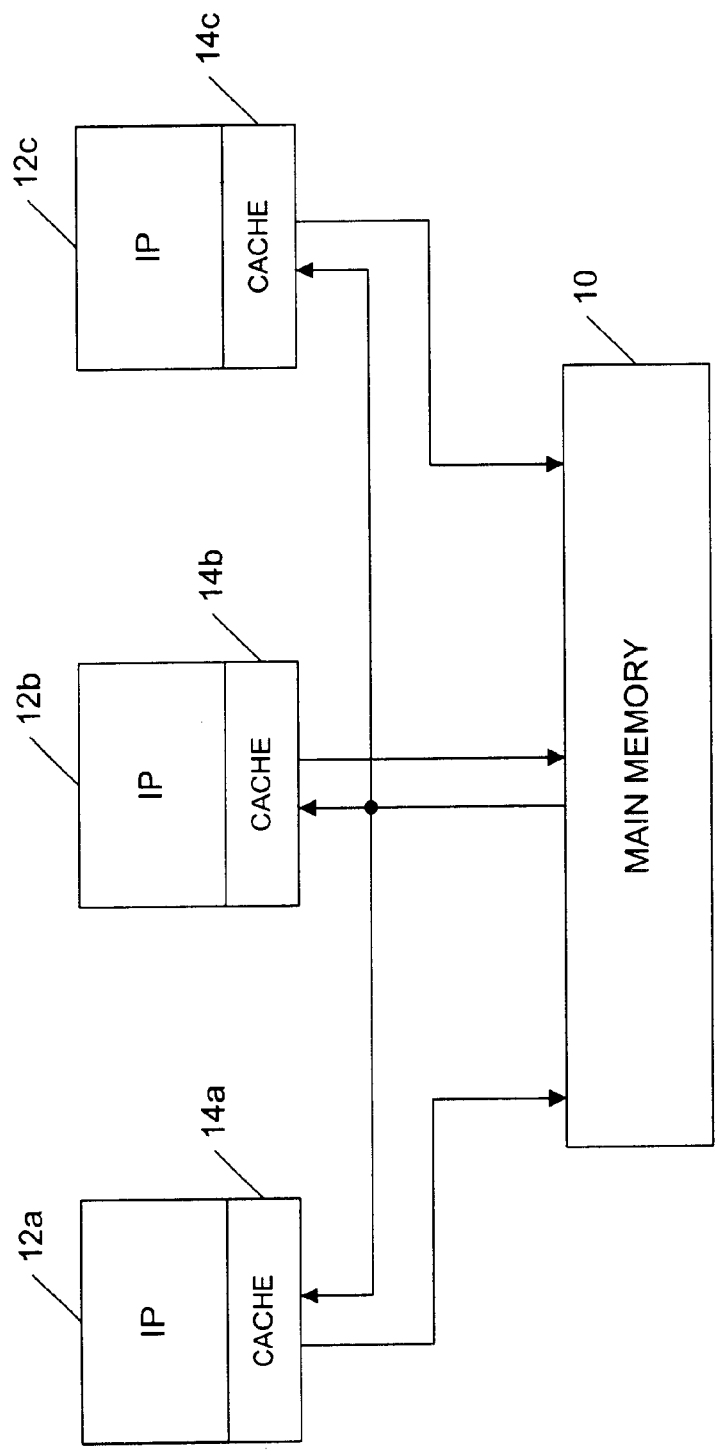
FIG. 1 is a block diagram of an exemplary multiprocessor computer system in which the present invention is employed.

Referring to the drawings, wherein like numerals represent like elements throughout, FIG. 1 is a block diagram of an exemplary multiprocessor computer system in which the present invention is employed. The computer system comprises a main memory 10 and a plurality of processors 12a, 12b, 12c, etc. that each issues addresses to the main memory 10 (i.e., "fetches") to retrieve data stored at those addresses. Each processor 12a, 12b, 12c has a respective cache memory 14a, 14b, 14c for storing copies of data retrieved by that processor.

In the present embodiment, each processor 12a, 12b, 12c has its own port into the main memory 10. However, in other embodiments, the processors 12a, 12b, 12c could instead share a common bus for accessing main memory. Also in the present embodiment, data is fetched from the main memory 10 and stored in the cache memories 14a, 14b, 14c in four-word sets, i.e., each cache line comprises four words. In the present embodiment, each word comprises six bytes of data. The main memory 10 maintains an indication of the status (e.g., "copy" or "shared" vs. "original" or "exclusive") of each four-word set that has been copied to one or more of the cache memories.

In operation, if processor 12a fetches a four-word data set from the main memory 10 with permission to modify the data in the set, the cache status entry in the main memory 10 will indicate that the data in the set is held by processor 12a exclusively. Any attempt by, for example, processor 12b to access the data at that same address in main memory will be unsuccessful until the modified data in the cache of processor 12a has been written back into the main memory 10 (i.e., "returned") by processor 12a.

Alternatively, processor 12a may request data from the main memory 10 without permission to modify the data. In this instance, the cache status entry for the data will indicate that processor 12a has the data in a shared state. Another processor, such as processor 12b, may also access the data in a shared state, but may not gain exclusive access to the data until that data has been invalidated in the cache of processor 12a.

In the present embodiment, access to data in the main memory 10 is controlled by a demand scheme. A processor that needs to access data can cause the processor that currently holds the data in its associated cache to relinquish rights to that data. Thus, if a task running on processor 12a requests exclusive access to data that is held with shared status by processor 12b, the main memory 10 will send a "purge" request for the addressed location to processor 12b. This request will cause processor 12b to make the data set invalid in its cache.

Similarly, when one processor, such as processor 12a, requests shared access to data that is held exclusively by another processor, such as processor 12b, the main memory 10 cannot send the addressed data to processor 12a, but instead, will send a "return" request to processor 12b that causes processor 12b to write the data set back into the main memory 10. Once the data has been returned to the main memory 10 and its cache status entry updated, the data may be sent to processor 12a as requested.

The inventors have discovered that in larger multiprocessor computer systems, the overhead associated with "return" requests, which result for example when a task running on one processor requests access to data that is held as original data (i.e., exclusively) in the cache of another processor, can lead to significant performance degradation in the system. In response to this discovery, the inventors have invented a new and useful method and apparatus for limiting the amount of original data held in the caches of each processor, thereby reducing the number of "return" requests issued to the processor caches. This minimizes the previously discovered performance degradation.

Figure 2:
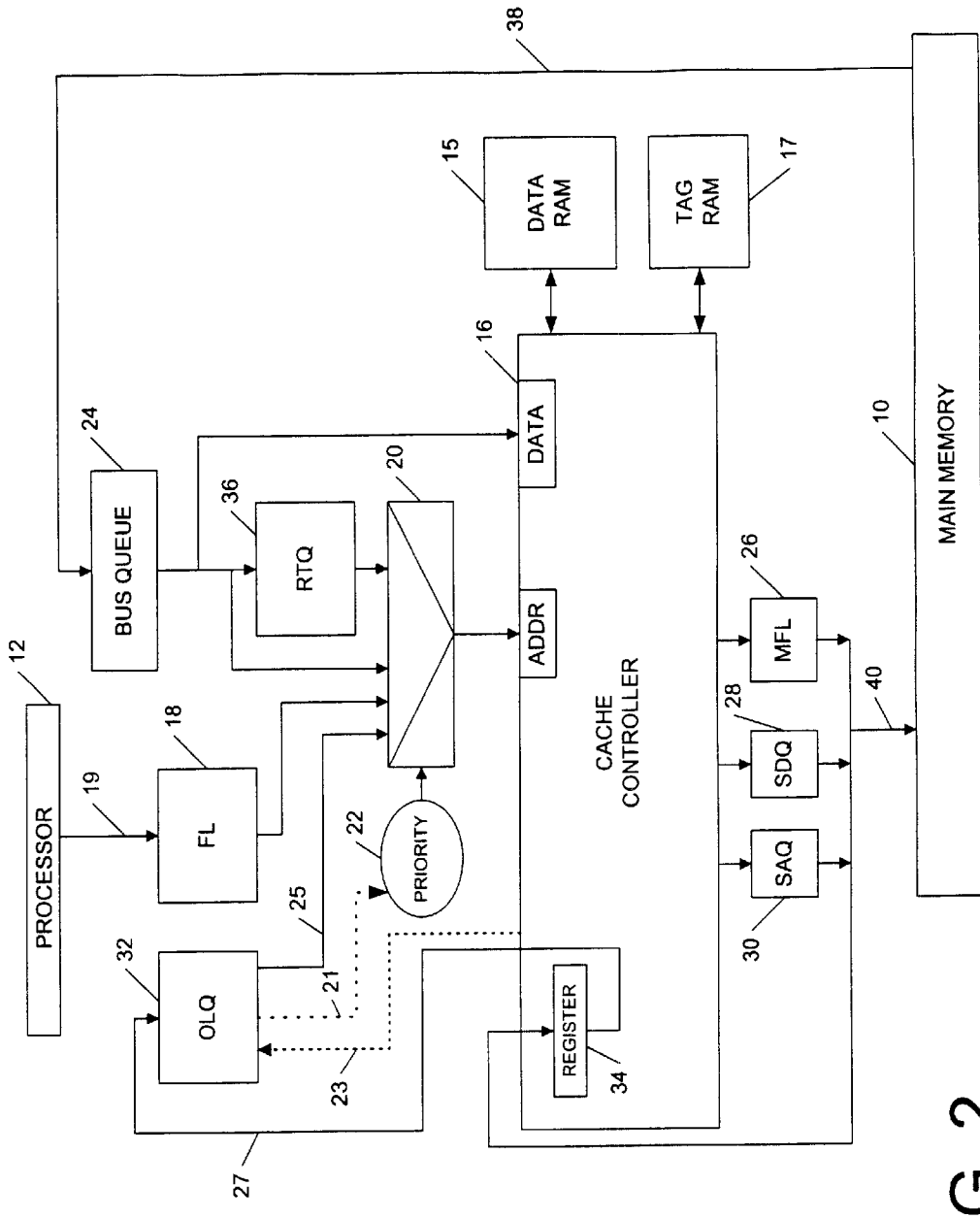
FIG. 2 is a block diagram illustrating the design of a cache in accordance with a preferred embodiment of the present invention.

FIG. 2 is a block diagram illustrating the design of a cache memory, in accordance with a preferred embodiment of the present invention. The cache memory design illustrated in FIG. 2 may be used to implement each of the caches 14a, 14b, 14c shown in the exemplary system of FIG. 1. In the present embodiment, the cache memory comprises a one-way set associative cache memory.

As shown, the cache memory comprises a first random access memory (RAM) 15 for storing four-word data sets fetched from main memory, and a second RAM 17 for storing the cache tag values. The cache receives address information or data from the main memory 10 via a dual-purpose (i.e., address or data) bus 38. Addresses and data received from the main memory are buffered by a queue 24, referred to herein as the Bus Queue.

A controller 16 controls the overall operation of the cache, including storing data and tag values in the DATA and TAG RAMs 15, 17, performing cache "hit" and "miss" determinations, and returning data stored in the DATA RAM 15 to the main memory 10 upon request. The controller 16 receives address information via an ADDR input and data via a DATA input. Addresses are received by the controller 16 via a multiplexer 20 whose input selection is determined by priority logic 22.

Addresses are fed to the multiplexer 20 from various queues, or buffers, including the Bus Queue 24 and buffers 18, 32, and 36. In the present embodiment, queue 18, referred to herein as the Fetch List (FL), buffers addresses issued by the processor 12 in connection with memory fetch operations. As mentioned above, addresses issued to the cache by the main memory 10, for example during a "return" operation, are buffered in the Bus Queue 24. Queue 36, referred to herein as the Return Queue (RTQ), provides additional buffering of "return" addresses issued by the main memory 10. The RTQ 36 provides this buffering in the event that the cache controller 16 is busy when a "return" address is presented at the output of the Bus Queue 24. Queue 32, referred to herein as the Original Data Limiting Queue (OLQ) 32, stores addresses of original data written to the cache, in accordance with the present invention, as described more fully below.

Data fetched from the main memory 10 is input to the controller 16 directly from the Bus Queue 24. The controller 16 stores the data in the DATA RAM 15, as appropriate.

Addresses and data issued by the cache controller 16 to the main memory 10 via bus 40 are also buffered, or queued. Specifically, a memory fetch list (MFL) queue 26 receives addresses issued by the controller during fetch operations (e.g., as the result of a cache "miss"), and the MFL queue 26 issues these addresses, in turn, to the main memory 10 via bus 40. Cache address and data information to be returned to main memory 10 by the controller 16 are output to a store address queue (SAQ) 30 and a store data queue (SDQ) 28, respectively, which, in turn, place the address and data information on bus 40 to main memory 10.

In use, a request by the main memory 10 for the controller 16 to "return" a given four-word data set to the main memory (e.g., because another processor is requesting the same data) is processed as follows. The main memory 10 places the address of the four-word data set on bus 38. The address is captured by the Bus Queue 24. On a subsequent clock cycle, the address will reach the output of the Bus Queue 24. If at that time the Bus Queue 24 output is selected by the priority logic 22 as the current input to the ADDR input of the controller 16, then the controller 16 receives the address from the Bus Queue 24. Alternatively, if at that time the priority logic 22 has a different input of the multiplexer 20 selected, or if the controller 16 is otherwise unable to accept the address from the Bus Queue 24, then the address of the data to be returned will be stored temporarily in the RTQ 36. Based on the priority scheme implemented by the priority logic 22, the address in the RTQ 36 will eventually be fed to the ADDR input of the controller 16.

When the controller 16 receives the address of the data to be returned, it queries the TAG RAM 17 to make sure that the requested four-word data set (i.e., the requested cache line) has not been invalidated. If the data is still valid, then the controller 16 retrieves the data from the DATA RAM 15, and then places the address of the data, and the data itself, in the SAQ 30 and SDQ 28 buffers, respectively. Subsequently, the address and data will be placed on the memory bus 40 to be written back to main memory 10. The controller 16 will then update the TAG RAM 17 accordingly. This completes the return operation.

A memory fetch operation initiated by the processor 12 is performed as follows. First, the processor issues on address bus 19, the memory address of a four-word data set to be retrieved from the main memory 10. The address is captured in the FL queue 18. In accordance with the priority scheme implemented by the priority logic 22, the address of the data set to be fetched will eventually be fed to the ADDR input of the cache controller 16. The controller 16 will then query the TAG RAM 17 to determine whether the requested data is already present in the DATA RAM 15.

If the data is already present (i.e., a cache "hit"), the controller 16 retrieves the data from the DATA RAM 15. The controller 16 then outputs the data to the processor 12 via a data bus (not shown). This would complete the fetch operation.

On the contrary, if the controller 16 determines from the TAG RAM 17 that the data is not already present in the DATA RAM 15 (i.e., a cache "miss"), then the controller 16 initiates a fetch to the main memory 10. Specifically, the controller 16 outputs the address to the MFL 26 which, in turn, issues the address to the main memory 10 via bus 40. The main memory 10 retrieves the requested data and places it on bus 38. The data will then be captured by the Bus Queue 24 and subsequently supplied to the DATA input of the controller 16 (as well as to the processor 12). The controller 16 writes the data to the DATA RAM 15 and then updates the TAG RAM 17 accordingly. Thus, a copy of the data requested by the processor 12 is now stored locally in the cache.

The processor 12 can have either "shared" access or "exclusive" access to data that it fetches from the main memory 10 and stores in its cache. The status of each four-word data set stored in the DATA RAM 15 is indicated in the corresponding entry in the TAG RAM 17. As stated above, data to which the processor 12 has "exclusive" access, i.e., data that the processor is permitted to modify, is referred to herein as "original" data, whereas data to which the processor has "shared" access, i.e., data that the processor is not permitted to modify, is referred to simply as a "copy."

As mentioned above, the inventors have discovered that, particularly in the case of large multiprocessor computer systems, the overhead associated with transferring original data from the cache of one processor to another (e.g., in connection with a "return" operation) can result in significant performance degradation. The inventors have discovered that in larger multiprocessor computer systems, the overhead associated with "return" requests, which result for example when a task running on one processor requests access to data that is held as original data (i.e., exclusively) in the cache of another processor, can lead to significant performance degradation in the system. In response to this discovery, the inventors have invented a new and useful method and apparatus for limiting the amount of original data held in the caches of each processor, thereby reducing the number of "return" requests issued to the processor caches. This minimizes the previously discovered performance degradation.

According to the present invention, the cache illustrated in FIG. 2 further comprises a queue 32, referred to herein as the Original Data Limiting Queue (OLQ). Preferably, the OLQ 32 comprises a first-in, first-out queue. Other queue schemes, such as a priority-based scheme, can be used in other embodiments.

In accordance with the present invention, the OLQ 32 stores the address of each copy of original data (i.e., data to which the processor has "exclusive" access) that is fetched from the main memory 10 and stored in the DATA RAM 15 of the cache. Once the depth of the OLQ 32 is reached, the storage of each new address in the queue causes a previously stored address to be output from the queue. For each address output from the OLQ 32, the cache controller 16 returns the corresponding data in the DATA RAM 15 to the main memory via the SAQ/SDQ buffers 28, 30 and bus 40. The OLQ 32 thus effectively places a limit on the amount of original data stored in the DATA RAM 15 of the cache.

In greater detail, during a fetch operation initiated by the controller 16 as a result of a cache "miss", the address of the data to be fetched is stored in the MFL queue 26 and also output onto the memory bus 40. After the main memory 10 retrieves the data and provides it to the cache controller 16 via bus 38 and the Bus Queue 24, the address stored in the MFL queue 26 is clocked into a register 34 for temporary storage. The cache controller 16 then writes each word of the four-word data set to the DATA RAM 15. In the present embodiment, as the first word of the four-word data set is being written to the DATA RAM 15, the controller 16 provides the address of that data from the register 34 to the OLQ 32. The address is then stored as a new entry in the OLQ 32. This process continues for each subsequent fetch of original data. Once the depth of the OLQ 32 is reached, the storage of each new address in the queue causes a previously stored address to be presented at the output of the OLQ 32.

The output of the OLQ 32 feeds one of the inputs to the multiplexer 20. When an address is presented at the output of the OLQ 32, the OLQ 32 signals the priority logic 22 via line 21 to include the OLQ output in the priority selection scheme of the multiplexer 20. Subject to the priority scheme, the address output from the OLQ 32 will eventually be input to the cache controller 16. In the present embodiment, of all the inputs to multiplexer 20, the priority logic 22 gives the lowest priority to the OLQ output. This minimizes contention between the OLQ 32 and the other inputs to the multiplexer 20. However, in other embodiments, the OLQ output can be given higher priority over the other inputs to the multiplexer 20.

When the cache controller 16 receives an address from the OLQ via its ADDR input, it queries the TAG RAM 17 to determine whether the data is still "valid" in the cache (i.e., not invalidated). If the data is still valid, then the data (i.e., four-word set) is retrieved from the DATA RAM 15 and the address and data are placed in the SAQ 30 and SDQ 28 buffers, respectively, to be returned to the main memory 10. Thus, in effect, the use of the OLQ 32 in accordance with the present invention forces the "return" of original data to the main memory 10 in order to limit the amount of original data in the cache. When the "return" operation is complete, the cache controller 16 sends a confirmation signal back to the OLQ 32 via line 23.

Preferably, the depth of the OLQ 32 is programmable, so that a system administrator can control the amount of original data that the cache can maintain. In a multiprocessor computer system, the OLQ 32 in each processor cache can be programmed individually, or collectively, as desired. The depth of the OLQ 32 in each cache can be programmed manually, or programmatically (i.e., under software control).

Figure 3:
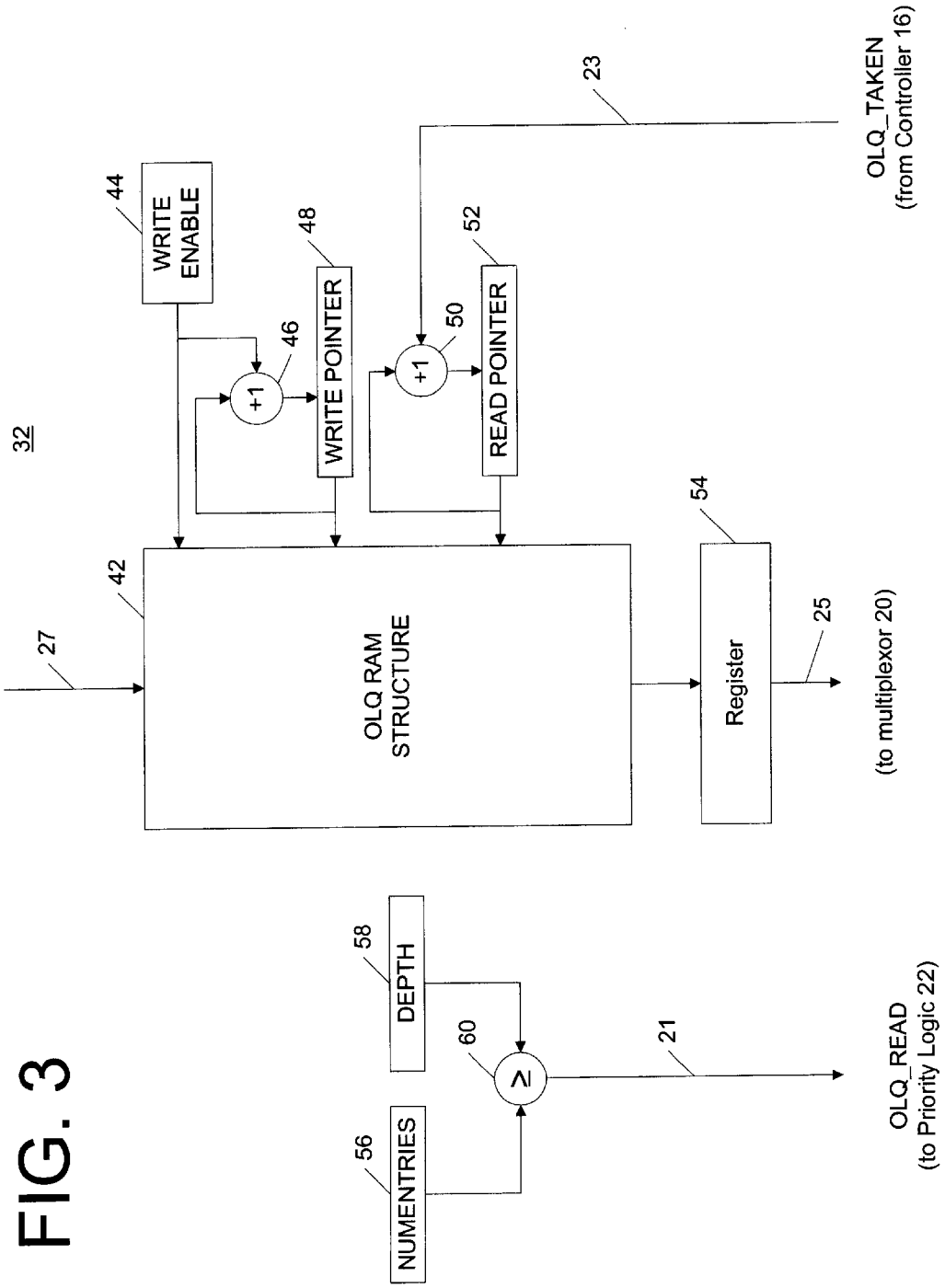
FIG. 3 is a block diagram illustrating further details of the cache of FIG. 2, in accordance with the preferred embodiment.

FIG. 3 is a block diagram illustrating further details of the OLQ 32, in accordance with the preferred embodiment. As shown, the OLQ 32 comprises a random access memory structure (RAM) 42 that receives addresses from register 34 at its write port for storage therein. In the present embodiment, the RAM 42 has seven hundred sixty-eight (768) addressable memory locations for storing addresses received from the register 34, and thus, the OLQ 32 can have a maximum programmable depth of 768 address entries in this embodiment. Of course, in other embodiments, the RAM 42 could have more or fewer addressable locations.

A write pointer 48 points to the address of the next available entry in the RAM 42 (i.e., the next available location for storing an address from register 34). The write pointer 48 is initialized to a value of zero (i.e., the first location in RAM 42).

A read pointer 52 points to the address of the next entry to be read out of the RAM 42 once the programmable depth of the OLQ 32 is reached. As mentioned above, addresses are read out of the OLQ 32 according to a first-in/first-out rule. The read pointer 52 is also initialized to zero, since that will be the location of the first address to be written to the RAM 42.

A write enable signal 44 is applied to the RAM 42 to control when an address in register 34 is written to the RAM 42. Specifically, as the first word of a four-word data set that has been fetched from memory is being written to the cache RAM 15 as original data by the controller 16 (and so long as the OLQ RAM 42 is not full), the write enable signal is asserted and applied to the RAM 42, causing the address stored in register 34 (i.e., the address of the data being written to cache RAM 15) to be written to the location in RAM 42 to which the write pointer 48 currently points. Once the address is written to RAM 42, the write pointer 48 is incremented as indicated in FIG. 3 at 46, so that it points to the next available location in RAM 42.

An output register 54 is coupled to the output port of the RAM 42. The register 54 always holds the next address to be output from the OLQ 32 once the programmable depth of the OLQ 23 is reached. Specifically, the location in RAM 42 to which the read pointer 52 points, is written into the register 54 after every write to, or read from, the RAM 42. This ensures that the register 54 always holds the correct address to be read out of the RAM 42 once the programmable depth is reached, in accordance with the first-in/first-out rule. It should be noted, however, that at the outset, when the OLQ RAM 42 is initially empty (i.e., nothing is stored at location zero), the register 54 will initially be loaded directly from register 34, and then thereafter, from the location to which the read pointer 52 points.

Registers 56 and 58, in combination with logic 60, determine when the programmable depth of the OLQ 32 is reached, and thus, control the read out of addresses from the OLQ 32 via register 54. Specifically, register 56 holds a value indicative of the total number of entries currently stored in the RAM 42. The value in register 56 is incremented each time a new address is written to the RAM 42, and the value is decremented each time an entry (i.e., an address) is read out of the OLQ 32 and passed to the cache controller via multiplexer 20. Register 58 contains a value indicative of the depth of the OLQ 32, i.e., the total number of addressable locations in RAM 42 that can be used for the OLQ 32. In the present embodiment, the maximum programmable depth is 768 entries. The depth of the OLQ 32 is thus reprogrammed by loading a new value into register 58.

Logic 60 compares the value in register 56 to the value in register 58. When the value in register 56 (i.e., the total number of entries currently stored in RAM 42) is equal to or greater than the value in register 58 (i.e., the programmed depth of the OLQ 32), then an OLQ_READ signal is sent to the priority logic 22 via line 21 to indicate to the priority logic that an address is ready to be read out of register 54, so that the corresponding data in cache RAM 15 can be returned to main memory 10 in accordance with the present invention, as described above. When the cache controller 16 receives the address via multiplexer 20, it indicates to the OLQ 32, via an OLQ_TAKEN signal on line 23, that it has received the address from the register 54 and has returned the data to the main memory. As illustrated in FIG. 3 at 50, this causes the read pointer to be incremented so that it points to the next address to be read out of the OLQ 32 (thus following the first-in/first-out rule). That next address will be clocked into register 54, and will remain there until the logic 60 again determines that the programmable depth has been reached. The process will then be repeated.

According to another feature of the present invention, the cache controller 16 can be programmed to keep a copy (in RAM 15) of any original data that it returns to the main memory as a result of receiving an address from the OLQ 32. That is, rather than invalidating the original data returned to main memory, the cache controller 16 instead merely changes its status in cache RAM 15 from "original" (i.e., "exclusive") to "copy" (i.e., "shared"). This way, if the processor 12 subsequently requests a "copy" of that data, it will already be present in the cache RAM 15. Otherwise, the cache controller 16 would have to initiate a fetch for that data from the main memory 10. Preferably, this "keep copy" capability can be turned on and off as desired.

As the foregoing illustrates, the present invention is directed to a method and apparatus for limiting the amount of original data stored in a processor cache. While the invention is described herein as being particularly useful in a computer system comprising multiple processors, the invention is by no means limited thereto. For example, the method and apparatus of the present invention can be used in a single processor computer system as well. Additionally, the present invention is not limited to use in the particular computer system or cache memory design illustrated in FIGS. 1, 2, and 3. Rather, the present invention can be used in any computer system that employs a cache of any kind for storing original data (i.e., a modifiable copy of data) fetched from memory. Additionally, in a computer system having multiple levels of caching, e.g., first, second, third level caches, etc., the method and apparatus of the present invention can be employed at any one or all of the levels, if desired. Also, while in the embodiment illustrated above, the cache is illustrated as being external to the processor, in other embodiments, the cache can be incorporated on the same chip or substrate as the processor. Thus, it is understood that changes may be made to the embodiment described above without departing from the broad inventive concepts thereof. Accordingly, the present invention is not limited to the particular embodiment disclosed, but is intended to cover all modifications that are within the spirit and scope of the invention as defined by the appended claims.

What is claimed is:

1. Apparatus for use in a computer system having a main memory, a processor that issues addresses to the main memory to retrieve data stored at those addresses, and a cache in which copies of data retrieved by the processor are temporarily stored as original data, said apparatus comprising:

a queue that stores the address of each copy of original data stored in the cache, the queue having a depth whereby once the depth is reached, addresses are successively read out of the queue as new addresses are stored in the queue, the cache returning to the main memory, for each address read out of the queue, the corresponding original data stored in the cache.

2. The apparatus recited in claim 1, wherein the queue comprises a first-in, first-out queue.

3. The apparatus recited in claim 1, wherein the depth of the queue is programmable.

4. Apparatus for use in a multiprocessor computer system having a main memory, a plurality of processors that issue addresses to the main memory to retrieve data stored at those addresses, and a cache coupled to each processor in which copies of data requested by the processor are temporarily stored as original data, said apparatus comprising, for each cache, a queue that stores the address of each copy of original data stored in the cache, the queue having a depth whereby once the depth is reached, addresses are successively read out of the queue as new addresses are stored therein, the cache returning to the main memory, for each address read out of the queue, the corresponding original data stored in the cache.

5. The apparatus recited in claim 4, wherein the queue comprises a first-in, first-out queue.

6. The apparatus recited in claim 4, wherein the depth of each queue is programmable.

7. In a computer system comprising a main memory, a processor, and a cache memory, a method comprising the steps of:

(a) storing in the cache as original data, a copy of data requested by the processor from the main memory at a selected address;

(b) storing in a queue having a depth, the address of the copy of the original data stored in the cache;

(c) repeating steps (a) and (b) for each subsequent original data request by the processor; and (d) as addresses are output from the queue once the depth of the queue is reached, for each such address, returning the corresponding original data in the cache to the main memory.

8. The method recited in claim 7, wherein the queue in which addresses are stored in step (b) comprises a first-in, first-out queue.

9. The method recited in claim 7, further comprising the step of adjusting the depth of the first-in, first-out queue.

* * * * *